US006313833B1

(12) United States Patent
Knight

(10) Patent No.: US 6,313,833 B1
(45) Date of Patent: Nov. 6, 2001

(54) GRAPHICAL DATA COLLECTION AND RETRIEVAL INTERFACE

(75) Inventor: Timothy Orr Knight, Palo Alto, CA (US)

(73) Assignee: Prophet Financial Systems, Palo Alto, CA (US)

( * ) Notice: Subject to any disclaimer, the term of this patent is extended or adjusted under 35 U.S.C. 154(b) by 0 days.

(21) Appl. No.: 09/173,853

(22) Filed: Oct. 16, 1998

(51) Int. Cl.[7] ................................................. G06F 15/00
(52) U.S. Cl. ........................ 345/339; 345/346; 345/356; 345/349; 705/10; 705/35; 705/36; 705/37
(58) Field of Search ................................. 345/333–335, 345/352–354, 356, 350–351, 146, 349, 339; 707/101–104, 906, 908; 705/101, 35, 36, 37

(56) References Cited

U.S. PATENT DOCUMENTS

| | | | |
|---|---|---|---|
| 4,866,634 | 9/1989 | Reboh et al. | 364/513 |
| 5,206,949 | 4/1993 | Cochran et al. | 395/600 |
| 5,257,185 | 10/1993 | Farley et al. | 364/419.19 |
| 5,627,979 | 5/1997 | Chang et al. | 395/335 |
| 5,668,966 | 9/1997 | Ono et al. | 345/356 |
| 5,761,656 | 6/1998 | Ben-Shachar | 707/4 |
| 5,794,178 | 8/1998 | Caid et al. | 704/9 |
| 5,838,317 | 11/1998 | Bolnick | 345/339 |
| 5,841,437 | 11/1998 | Fishkin et al. | 345/346 |
| 5,870,090 | * 2/1999 | Takai | 345/342 |
| 5,911,138 | 6/1999 | Li et al. | 707/3 |
| 5,918,216 | * 6/1999 | Miksovsky et al. | 705/35 |
| 5,923,307 | * 7/1999 | Hogle et al. | 345/342 |
| 5,923,327 | * 7/1999 | Smith et al. | 345/341 |
| 5,933,830 | 8/1999 | Williams | 707/100 |
| 5,956,019 | * 9/1999 | Bang et al. | 345/173 |

(List continued on next page.)

OTHER PUBLICATIONS

Li, Jia et al., "Data Object and Label Placement for Information Abundant Visualizaitons," Univerity of Maryland, Aug. 27, 1998, pp. 1–14.

Swan, Russell et al., "Evaluating a Visual Information Retrieval Interface: AspInquery at TREC–6," presented at Workshop on Information Exploration at CHI 98, 1998, pp. 1–5.

Fishkin, Ken et al., "Enhanced dynamic queries via movable filters," In Human Factors in Computing Systems (CHI '95 Proceedings), pp. 415–420. New York: ACM Press.

Shneiderman, Ben "Designing the User Interface: Strategies for Effective Human–Computer Interaction", (Addison Wesley Longman, Inc., 1998), pp. 79–89; 186–213; 235–261; 325; 391–397; 522–541.

Primary Examiner—Raymond J. Bayerl
Assistant Examiner—Thomas J Joseph
(74) Attorney, Agent, or Firm—J. Nicholas Gross

(57) ABSTRACT

A graphical user interface is provided for capturing application data in picture form. A set of data capture tools, including a subjective data parameter pallette and accompanying data canvas, are presented to an operator during an interactive session. By selecting and placing such data parameters on the data canvas, a user can paint a data picture representing his/her subjective motivations, mental impressions, reasons, etc., for engaging in a particular transaction. In a preferred embodiment, the present interface is used in connection with a stock portfolio management application, where it is used to capture user rationale and logic for purchasing or selling financial instruments such as securities, options, etc.

91 Claims, 3 Drawing Sheets

Microfiche Appendix Included
(1 Microfiche, 46 Pages)

U.S. PATENT DOCUMENTS

| | | | |
|---|---|---|---|
| 5,966,126 | 10/1999 | Szabo | 345/348 |
| 5,977,973 * | 11/1999 | Sobeski et al. | 345/346 |
| 5,982,302 * | 11/1999 | Ure | 345/173 |
| 5,983,220 | 11/1999 | Schmitt | 707/5 |
| 5,999,177 * | 12/1999 | Martinez | 345/342 |
| 6,014,661 | 1/2000 | Ahlberg et al. | 707/3 |
| 6,014,664 | 1/2000 | Fagin et al. | 707/5 |
| 6,023,273 | 2/2000 | Cox et al. | 345/339 |
| 6,028,601 * | 2/2000 | Machiraju et al. | 345/336 |
| 6,064,984 * | 5/2000 | Ferguson et al. | 705/36 |
| 6,094,648 | 7/2000 | Aalbersberg | 707/3 |
| 6,101,484 * | 8/2000 | Halbert et al. | 705/35 |
| 6,133,914 | 10/2000 | Rogers et al. | 345/334 |
| 6,189,019 * | 2/2001 | Blummer et al. | 707/513 |
| 6,208,339 * | 3/2001 | Atlas et al. | 345/338 |
| 6,237,006 * | 5/2001 | Weinberg et al. | 707/103 |

* cited by examiner

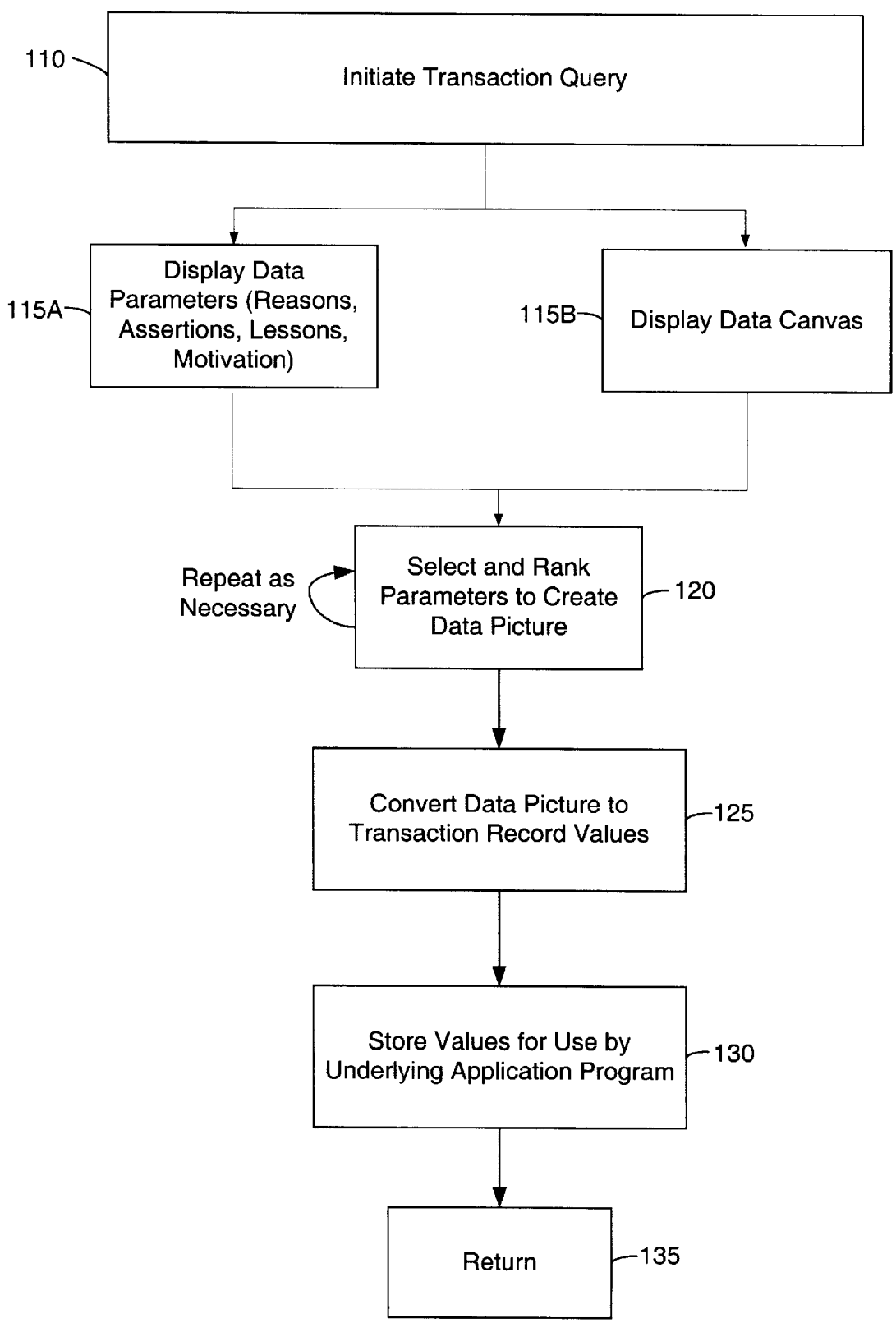

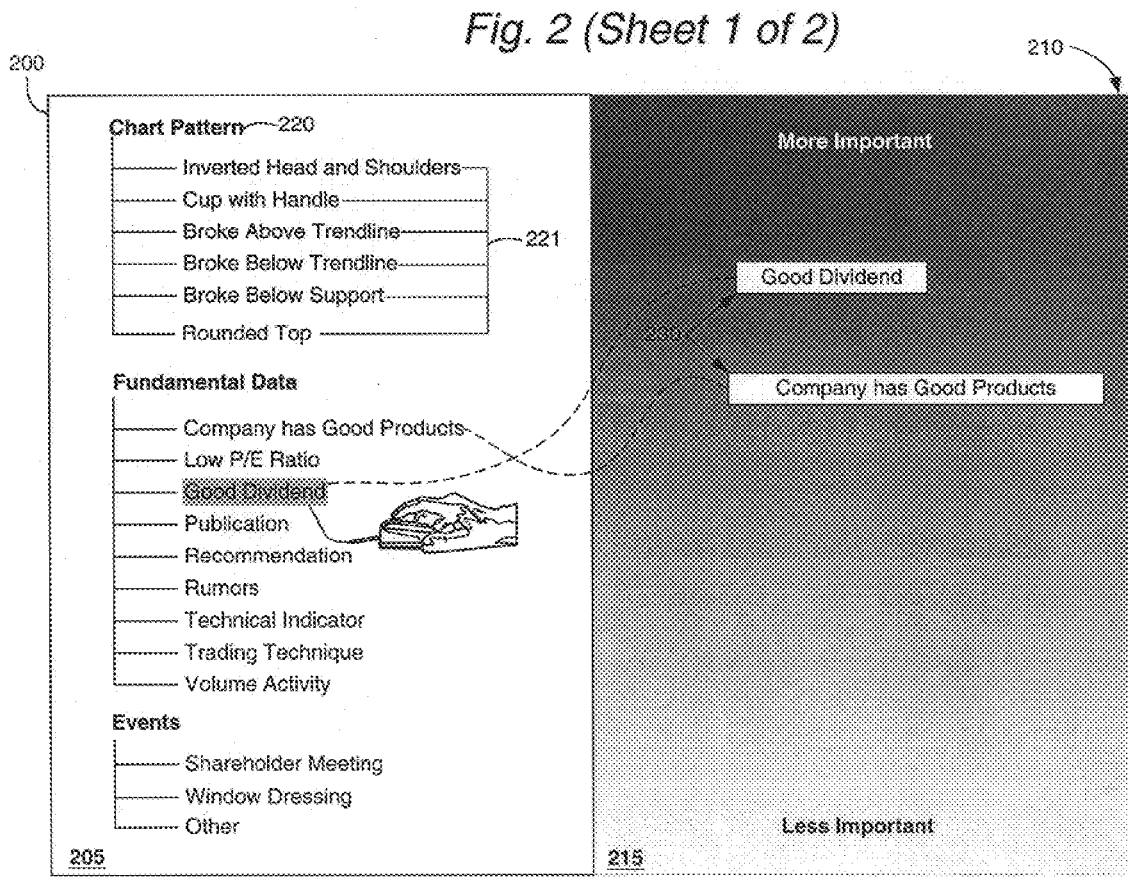
Fig. 2 (Sheet 1 of 2)

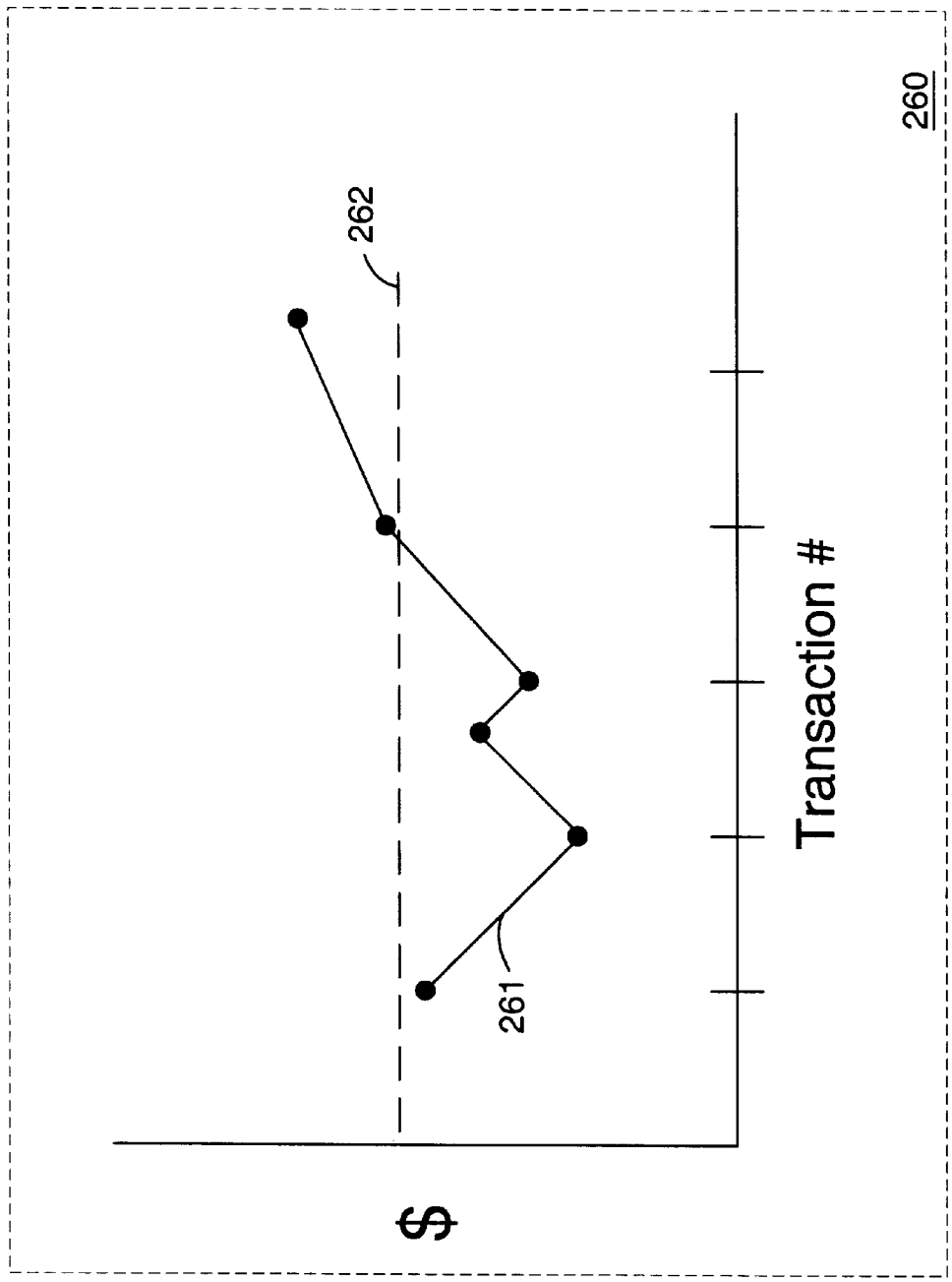
Fig. 2 (Sheet 2 of 2)

GRAPHICAL DATA COLLECTION AND RETRIEVAL INTERFACE

CROSS REFERENCE TO MICROFICHE APPENDIX

Appendix A, which forms part of this disclosure and is incorporated by reference herein, is a microfiche appendix consisting of 1 sheet of microfiche having a total of 46 frames. Microfiche Appendix A is a list of computer programs and related data in an embodiment of the present invention, which is described more completely below.

FIELD OF INVENTION

The present invention relates to a graphical user data collection/presentation interface. The invention is particularly suited for use with computer programs intended as personal information assistants, consumer preference/opinion gathering tools, and in similar environments.

COPYRIGHT NOTICE

A portion of the disclosure of this patent document contains material that is subject to copyright protection. The copyright owner has no objection to the xerographic reproduction by anyone of the patent document or the patent disclosure in exactly the form it appears in the Patent and Trademark Office patent file or records, but otherwise reserves all copyright rights whatsoever.

BACKGROUND OF INVENTION

User interfaces for computer programs and operating systems are well-known in the art. At first, such interfaces were entirely text based, and thus primitive, difficult to use, and lacking in functionality. This limitation, too, restricted their use primarily to a small segment of the population consisting of advanced skill computer users. With the advent of graphical interfaces by Xerox, Apple, Microsoft, etc., the use of computers has expanded dramatically to touch upon the entire potential consuming public. Furthermore, the use of graphical interfaces has improved the functionality of computers significantly, so that functions that once required numerous lengthy text based input parameters can now be performed by simple iconic replacements. For example, the task of copying a file from one system drive to another once required extensive knowledge of the exact syntax format of the system, combined with lengthy keyboard data entry. Now, such function can be performed simply by clicking a mouse button on a graphical representation of such file on the first drive, and then manually dragging and dropping such file onto another icon representing the second drive. Utility, productivity, etc., have all increased substantially now because tasks that once required numerous cumbersome operations can now be performed in a fraction of the time, and without lengthy operator training procedures. This is due, in part, to the fact that most users can intuitively grasp the nature of a function when it is presented in visual form to mimic a real-life manual operation; in this case, the act of moving a file (represented in icon form to resemble a paper document) from one location (represented in icon form as a filing cabinet) to another (represented in icon form as a different filing cabinet). For a useful background reference on this topic, a reference by Schneiderman, entitled "Designing the User Interface," is recommended.

To date, nonetheless, graphical interfaces have been used in computer applications (those programs running under the operating system) primarily for processing only objective data items. For purposes of the present disclosure, a distinction is loosely made between data items that are objective - i.e., can be quantified by some known benchmark outside the user's mental/cognitive impressions - and subjective, i.e., those data items that are primarily based on the user's personal preferences. As an example, an objective data item might be the temperature at a particular location and time; this can be represented by a data value - i.e., some number in Centigrade - that can be identified/verified by another measurement tool. Similarly, the amount of money in one's bank account can be quantified numerically with a known denomination. In contemporary programming form, this collection of data from the user shows up in, among other places, personal financial planning programs, which might ask a user to identify the real rate of return (a % number) expected/desired by the user for his/her investments.

In contrast, a subjective data item could be the personal enjoyment an individual attains as a result of listening a particular piece of music, the importance they assign to one factor that is part of particular choice they make, etc. For instance, a typical person purchasing an automobile could rank the following in the order of importance in their selection of a particular model: price, performance, comfort, insurance, and so on. Similarly, when asked why a specific course of action was taken, such as selling an equity position in a company, an individual might identify that he/she thought the price had reached a subjective target value, or that the company was lagging its competitors, or that the local newspaper ran a negative article on the company, etc., etc.

It should be understood that these are but typical examples, and it is apparent that a multitude of similar situations arise each day in connection with a person's experiences/interactions with the world around them. The above, of course, is a very limited explanation of the general differences between subjective and objective data items, and, of course, should be understood as such. There may be a relationship between the two, as for example when an objective data item (the occurrence of an event such as the announcement of a new product by a company) affects and/or results in a subjective data item (a person deciding to buy the company's stock). Thus, this classification is intended merely as an illustrative tool for explaining the basis of the present invention, and should not be taken as a limitation on any of the teachings set forth herein.

Some typical reasons why contemporary programs do not handle such subjective information, include, of course, the fact that few such programs are able to translate this information into machine-manipulable form so that meaningful conclusions can be drawn from the same, and that such results can be conveyed in some intelligent fashion to the user. Fewer still are able to collect this data in an efficient, user-friendly manner; those that do collect subjective data items do so using relatively primitive techniques. For example, the same personal financial planning program described above might ask a user to identify the level of risk he/she is willing to accept, by placing an electronic check mark on a screen form listing such options as "High," "Medium," "Low," etc. Similarly, a conventional on-line purchasing/marketing form might ask the user to identify on a scale of 1–10 the importance of various features of a product. To receive the user's input, an electronic representation of a sliding scale might be presented to the user, which he/she can manipulate and set with a computer mouse to a particular value. This is one means of effectuating the graphical object - action interface described above, but is somewhat limited because the user is required to adopt and accept the graphical objects, tools, and options presented to express his/her choices.

The general problems associated with interfaces that attempt to extract individual subjective data items include the fact that: (1) they rely on non-graphical interfaces, which make them unattractive, unintuitive and unfriendly to prospective users; (2) they present the user with a limited set of objects and interactions for his/her use; in other words, an online questionnaire for example might ask only about the four most important variables as perceived by the vendor, when in fact there may be a whole slew of factors important to the potential customer filling out such questionnaire; (3) they do not permit a user to ignore those items that are not of interest in the provided for universe of parameters; instead, they require the user to fill out page after page of questions, many of which may not be relevant or important to such user; (4) they take too much time to complete because they require cumbersome keyboard operations, and this results in poor data yield caused solely by user impatience; (5) they often require users to provide actual arithmetic or mathematical data input to represent data values perceived only subjectively by such users; in other words, if they ask a user to rate car characteristics, such person might have to assign a color parameter of a car as a "5," and a price parameter of such car as an "8". Later, the user might believe that the acceleration time is also important, and he/she would then be forced to compute some new value that is appropriate relative to the other numerical values already provided for other parameters. Furthermore, consideration of a new parameter might require scaling or re-adjustment of all prior values for other parameters. Such arithmetic manipulation is cumbersome and beyond the capability or interest level of many potential users of such programs.

It is apparent that many of these same problems are inherent in conventional objective data collection/ presentation systems, to the extent they even utilize a graphical interface. Accordingly, such systems would benefit from a solution that ameliorates such problems.

SUMMARY OF THE INVENTION

The present invention, therefore, aims to provide a graphical interface which permits a user to select from a palette of preferences to describe those factors influencing his/her subjective opinion, actions, etc., relating to various items/ events, and which allows such user to identify such factors to a data processing application efficiently, quickly, intuitively and without substantial human interaction;

An additional goal of the present invention is to provide a mechanism and method for application users to express subjective data in graphical, rather than arithmetic form, so that data entry procedures are simplified and made more efficient;

A further object of the present invention is to provide an apparatus and method for performing meaningful analyses of subjective data, by permitting application users to express subjective data in a graphical form that is nevertheless translatable into a data form that can be handled mathematically by an underlying application program;

Yet another object of the present invention is to provide a mechanism and method to permit a user to express a relative ranking of parameters pertaining to a particular topic/event in visual form, without requiring extensive data input, or human interaction/analysis;

Another object of the present invention is to provide a mechanism and method for users to express personal preference data items, as well as relationships between such items, through graphical tools which visually depict and/or prioritize such data items in a manner conducive to quick and easy understanding by the user;

A further object of the present invention is to provide a system and method for users to identify, store, recall and modify experiences, lessons and understandings gleaned from participating in various actions and transactions, so that they may learn and benefit from their past mistakes and successes when they adopt particular strategies for engaging such actions and transactions;

A preferred embodiment of an electronic interface of the present invention achieves these objects by permitting a user to communicate subjective data information concerning a proposed or actual action/transaction (i.e., such the user's mental impressions of such event, an item of interest, or some lesson learned by such user associated with the same) to an underlying application program during what can be generally described as a "data painting sessions." The interface includes a parameter "menu," (or pallette) which menu provides a user with a visible set of data parameters which may be associated with the subjective data information. The parameters can be presented in text form, symbolic form, or some other form easily comprehendable by the user, and can be customized in part by the user to reflect individual preferences. In a separate portion of the interface a parameter "canvas," is presented so that it is simultaneously visible with the parameter menu. The user can select and manipulate the data parameters, placing them on the parameter canvas using a drag and drop motion, thus generating a kind of data "picture" for the action/transaction. This data picture can be stored, retrieved, edited and modified at will during a later session if desired. The interface is preferably configured so that all of the user's subjective data information is captured using only the parameter menu and canvas tools presented by such interface, and during a single data collection session.

Again in a preferred embodiment, the interface is configured so that the data parameters associated with the subjective data information are selected and moved by such user from the parameter menu to the parameter canvas using an an electronic pointing device. The menu and canvass are located proximately to each other so that the user can perform the act of moving the parameters to the canvass in rapid fashion.

At the end of the data painting session in this preferred embodiment, the identified data parameters associated with the subjective data information are stored as one or more electronic records corresponding to an electronic data picture. Notably, this data picture includes numeric data values, but is generated transparently without numeric data input by the user, thus reducing the burden experienced by the user in presenting his/her data selections. The numeric data values are based on the physical location of the data parameters as placed by the user on the parameter canvas, thus allowing the user to rank the parameters in relative importance quickly, easily, and without computational effort on their part. This relative ranking between data parameters can be changed by the user by simply altering a relative physical arrangement of the data parameters on the parameter canvas using a computer mouse or similar pointing device. In certain applications for more skilled users, the data parameters can be ranked by both a relative horizontal and vertical location on said parameter canvas.

Further in the preferred embodiment, the parameter canvas includes a gradient visible to the user for assisting in the ranking of the data parameters. The gradient is presented in differing shades of color as reinforcing feedback. Additionally, while the user is arranging the data parameters, the parameter canvas conveys visible feedback information, alerting him/her to the action they are taking.

In another variation, and so as to save time and burden on the user, the interface can present an initial data picture to the user based on that person's prior data pictures. This initial data picture can then be modified as desired to reflect the particular action/transaction.

To further enhance the user's utilization of the interface, an additional chart or picture can be presented to them depicting various correlations between the data picture being created and prior data pictures made by such user. In this fashion, the user can determine at a glance what the outcome of a particular action/transaction is likely to be based on the variables identified at that time.

A preferred user data capture method of the present invention utilizes the aforementioned interface for permitting a user to identify personal parameters concerning an action and/or transaction to an underlying computer program.

Although the invention is described below in a preferred embodiment associated with a personal stock portfolio managing program, it will be apparent to those skilled in the art that the present invention would be beneficially used in many other applications where it is desirable to capture data in a fast, easy, and comprehensive manner that minimizes burden on a user providing such input.

BRIEF DESCRIPTION OF THE DRAWINGS

FIG. 1 is a flow chart depicting the general operation of an embodiment of the present invention;

FIG. 2 is a screen shot from a computer program application incorporating one embodiment of the interface of the present invention;

DETAILED DESCRIPTION OF THE INVENTION

FIG. 1 is a flow chart illustrating the basic operation of a data collection interface portion 100 of an application program incorporating the present invention. In a preferred embodiment the present interface is used by a stock portfolio managing program to elicit feedback and information concerning a user's motivations, opinions, reasonings, etc. for participating in a particular transaction—i.e., by either purchasing or selling a particular equity. This program is entitled "TotalTrader" and can be obtained from the assignee.

As used herein, nonetheless, the terms "action" or "transaction" are intended in their broadest sense to mean an event of interest to the user that has already occurred or may occur in the future, or even an article or item of interest to the user. For instance, in the latter case, when the present interface is used in connection with an online marketing or sales research program, a transaction can represent a user's interest in a particular product or service being offered by a vendor, such as an automobile or travel agency services. Accordingly, at step 110, a transaction data picture is requested from the user of such program. This operation takes place, for example, after preliminary data concerning the transaction is first obtained, such as date of the purchase, number of shares, price per share and the like. After this, the user is presented at step 115a with a visual window identifying both a pallette of parameters (representing assertions, reasons, motivations, etc.) and at 115b with a data canvas for creating a customized data picture depicting the user's total rationale for the transaction in question. It should be noted that for ease of use, and as shown in FIG. 2, the palette and canvas are presented visually to the user at the same time. As will be apparent from the description below, the palette and canvas present a simple, single data collection screen for the user to capture all of the information associated with a particular action/transaction during a particular session. The electronic windows for such palette and canvas are generated using well-known programming techniques, and the specifics of the same are not material to the present invention except as described herein. Nonetheless, a listing of the important source code routines used in the present invention is appended to the end of the present disclosure as Appendix A.

During an interactive session at step 120 (which can be thought of as a data "painting" session) the user is permitted to select from the list of parameters (which again can be reasons, assertions, etc.) presented, and to drag and drop any particular item as desired to a location on the data canvas. In this manner, the user can quickly, easily and intuitively manipulate subjective data parameters into a more concrete and structured format, representing a data "picture" without having to plow through numerous irrelevant data queries, and without having to maintain a precise mental arithmetic valuation (or relative ranking) of the data parameters selected. Instead, the vertical (and horizontal) placement of such data parameters as arranged within such window by the user can be used as ranking indicators. At the end of the data "painting" session at step 125 the data picture is converted into a series of data values in a fashion completely transparent to the user, and without any additional effort on their behalf. These data values are in turn either stored or passed on to an application program at step 130. The interface then yields control back to the main application program at 135.

FIG. 2 illustrates one embodiment of the inventive interface 200 as seen by a user at step 120. On the left hand side of the window, a menu list 205 of parameters 221, 222, etc. are identified. This set is presented visually to the user in what is known in conventional terms as a tree-structured menu. Preferably, for ease of use, this tree menu 205 has a shallow depth (i.e., number of levels) and reasonable breadth (i.e., number of items per level) that is manageable, and which permits a user to visualize all possible selections without having to perform time consuming scrolling operations. Generation of tree-structured menus is well-known in the art, and so will not be discussed at length here. The use of a tree-structured menu 205 is especially advantageous within the context of the present invention, nonetheless, since it permits a user to rapidly identify those reasons affecting or motivating their behavior vis-a-vis the transaction in question. Again, in the present preferred embodiment, the reasons and assertions presented in menu 205 are those factors commonly associated with actions or transactions (buying or selling) securities or options. These include such factors as technical charting indicators, specific events that may affect the stock price (a split announcement for example), rumors, tips from friends, etc. These factors are broken into larger category groups at a first level 220, and in more fine detail at a sub-category second level 221. For instance, category group "Chart Pattern" 220 is broken down into 6 sub-categories 221 identified as "Inverted Head & Shoulders," "Cup with Handle," "Broke above Trendline," "Broke below Trendline," "Broke below support," and "Rounded Top," all of which are commonly understood technical analysis tools in the field of financial instrument trading. It should be apparent that such category and sub-categories are merely illustrative of the parameters that could be identified in interface 200, and that the present invention is not limited to any specific set of the same. For example, in an interface geared towards understanding the motivations of a prospective consumer in the automotive field, category sets may include quality, warranty, price, performance, luxury, reliability, and so on. Sub-categories for price might be broken down into numerical sets ranging from 10k to 15k, 15k to 20k, 20–25k, 25–30k, etc. The particular implementation of the parameter set, of course, can be tailored to the features/functions associated with the item in question, so that reasonable allowance is made for variations in the characteristics of such item.

Another advantage of the present invention lies in the fact that the menu 205 can be supplemented by the user to include new categories 221 reflecting particular assertions, reasons, motivations, influences, etc., experienced by such user. As an example, a new category "other" 221 can be added to menu 205 to include such sub-categories as "Read in local newspaper," "Heard good things from John X," etc. Thus menu 205 can be customized in part, and this provides additional flexibility to accommodate particular influences in the user's realm of experience. Such additions to menu 205 can be effectuated using any number of known techniques in the art.

Accordingly, interface 200 presents the user with a complete and customized set 205 of parameters that are applicable to the transactions handled by an underlying application program. Moreover, such parameters are depicted in a manner that avoids prior art cumbersome multiple-page formats, which tend to confuse and slow down interaction between the user and the application program. The arrangement of menu 205 in fact, presents the user essentially with an electronic data pallette in a first portion of the interface, which he/she can easily visualize in complete form at a glance and utilize to create a data picture 210 on a data canvas 215 (or preference field) in a second portion of the interface as shown on the right hand side of interface 200.

In the example given in FIG. 2, data picture 210 includes two subjective parameters 230, 231 selected by a user from menu 205 as motivating his/her to purchase a particular stock. In this instance, such user has identified certain assertions as the basis for his/her action, including the fact that they are influenced by their perception that the company has a "Good Dividend," and that the "Company has good products." The selection of parameters 230 and placement in preference field/data canvas 215 is done with a conventional computer mouse in a drag and drop manner well-known in the art, and as illustrated generally in FIG. 2 by the path of the dotted lines shown there. Other techniques, such as direct control devices (light pens, touch-screens, and so on) or indirect control devices (touch pads, joysticks, trackballs etc.), can also be used in lieu of a mouse for the painting of data picture 210. The paramount consideration, in this respect, is that an easily manipulable tool should be selected to permit the user to interact quickly and intuitively with palette 220 and move objects (data parameters) to data canvas 215 with ease.

In this preferred embodiment, preference field/data canvas 215 is presented in a relevance spectrum format, with descriptors at the top/bottom providing visual feedback to the user to identify a value of importance for the identified parameter, ranging from "Less" to "More" important. This allows the user to not only identify the data parameters associated by them in connection with the transaction, but also to rank such parameter in a more objective fashion, both absolutely in terms of a perceived importance, but also relative to other factors. This ranking, too, can be done quickly by the user since it is done without the need for cumbersome arithmetic computations and/or manipulation of electronic sliding scales, etc. In fact, the only physical operations required of the user are the selection (preferably using a common computer mouse) of parameters on the left hand side of the interface, and their drag and drop placement on the right hand side of the interface. As the pallette 205 and canvas 215 are located closely and adjacent to each other spatially, this task can be performed extremely ergonomically and rapidly by a user utilizing a computer mouse. In most cases, in fact, the distance required for the user to move a data parameter from palette 205 to canvas 215 is relatively small: i.e., less than half the total interface screen size. This reduction in demands on the user's attention and time results in more thorough and accurate data extraction because the user is not discouraged or de-motivated by the interface from presenting his/her opinions in complete form, and in a manner that is more intuitive and in tune with the way in which most human operators work most comfortably - namely, with a "picture" of their impressions, rather than in hard numerical representations. Moreover, after such data is captured, it can be retrieved and modified at will by the user, permitting them to perfect and learn from their mental impressions of actual or proposed actions/transactions.

These advantages of the present invention can be illustrated very easily with simple example. In a typical prior art program interface, the user is required to parse through page after page of questions, assigning numerical values to each parameter of interest. This is slow because the user is confronted with an ocean of choices that may be of no importance, but which yet must still be navigated to satisfy the data collection goals of the underlying application. In the present invention, the user need only utilize those data parameters of interest to them from a data parameter pallette. Then, as the user traverses a typical prior art interface, they may assign a number of relevance values R1, R2 . . . Rk, and the like for each identified parameter. A substantial mental burden is imposed on the user in both remembering the relevance values previously provided for prior parameters, and in attempting to effect a relative ranking of new parameters within the framework of the data collection effort at that point. In other words, the user may associate two parameters with the same relevance, but if information on the two parameters is solicited at different times during the data collection interview, he/she is likely to forget the value previously assigned. This means that the data value given may be inaccurate, and the data collection effort is degraded. Furthermore, when confronted with the fact that he/she has previously identified two parameters as having a relative ranking of say 6 and 9, a third parameter lying between these two in importance must be assigned an arithmetic value that is calculated mentally by the user. A value for a fourth parameter, perhaps associated by the user between the third and second parameter in importance, must then be calculated by the user. It is apparent that this mental effort is both time consuming and potentially frustrating. In contrast, in the present invention, users can easily and dynamically arrange and re-arrange their identified priorities through simple physical manipulation, and without the need for tagging these parameters with hard, fixed arithmetic values. Instead, the underlying application program can simply process the data picture provided, and then carry out a computational evaluation of the necessary values to be associated with the data items arranged in the data picture. This fact, too, reduces significantly the time associated with a data interview, and is likely to result in greater user appreciation for (and utilization of) the underlying application programs.

A further advantage provided by the present invention lies in the fact that since no keyboard typing entries are required of the user, and no electronic "check boxes" or the like are filled in, errors in the data capture process are also reduced, thus further increasing the reliability of data captured using the inventive interface. In fact, the possibility of errors is minimized in large part because the user is permitted to see the entirety of his/her data entry visually for sufficient periods of time to allow for detection of obvious errors. This and other aspects of the present invention therefore make optimal use of visual information processing centers available to human operators.

Finally, a useful industry accepted predictive model of hand movement complexity in an interface (i.e., moving a pointing device to one region of a display to another) is provided by a formula in Schneiderman, at page 325. This formula states that:

$$\text{Index of difficulty} = \log_2(2D/W).$$

In this formula, D=distance that must be traveled across the screen by a pointing device (such as a mouse), and W is the area of the target for the pointing device. From this simple model, it is readily apparent that the interface proposed by the applicant is optimized to reduce user interaction difficulties. This is because, as seen in FIG. 2, the travel distance (D) for the user's mouse in moving data parameters from the menu to data canvas 215 is kept very small; conversely, the area (W) for data canvas 215 is relatively large. All things being equal, this mathematical model illustrates why an index of difficulty for the present invention is relatively small as compared to prior art interfaces which rely on the operator's ability to move a cursor across an entire screen (to address an item of interest) and then require fairly accurate control to land within a small designated area for expressing some value for such item of interest. A time for an operator to achieve such movement, of course, is directly related to such index as indicated by Schneiderman; again, for the present invention, this predictive modeling helps explain why an interface of the type described herein is much faster for even a novice operator, and thus more likely to be endorsed by the same.

Similarly, at pp. 391–397, Schneiderman addresses the issue of display layout "appropriateness," as measured by a series of metrics discussed therein, including task frequency and sequencing characteristics. An evaluation of the layout of the present invention by such metrics reveals, quite distinctly, that an optimal arrangement is provided from the user's perspective, because task sequences are kept extremely simple (the user need only perform one physical operation to input and classify a data parameter), and the physical arrangement of the interface (relative placement of data menu and data canvas) is implemented such that such physical operation is effectuated by a single motion that occurs over a very short distance, and with high accuracy. This minimizes the amount of visual scanning (and thus time and burden) required by the user to express his/her thoughts, because an interaction area is minimized as well. Since related ideas are grouped in physically contiguous areas in menu 205, this further reduces eye strain, mental strain, etc.

To further enhance the appearance and utility of data canvas 215, color, shading, highlighting and other visual indicators can be used to provide feedback to the user as well. In a preferred embodiment data canvas 215 includes a blue background, and is arranged so that a "gradient" is presented to the user in the form of shading arranged from darkest (more important) to lightest (least important). This arrangement is chosen to provide the user with a pleasant visual environment, and as a visible metaphor/reinforcer for the fact that factors weighing "heavier" in his/her mind should be placed in a heavier shade portion of the gradient. In addition, as individual data parameters 230 are moved on data canvas 215, nearby already-placed data parameters (or the appropriate spectrum legend at one end of the gradient), can "glow" or become highlighted to remind the user that they are moving the selected data parameter to a region of relevance that is close to the previously identified data parameter. This feature, too, helps the user to orient and rank his/her reasons, preferences, opinions, etc. in a more orderly and reliable fashion, and without the need for arithmetic computations. Another visual enhancement that could be made, of course, is the addition of scaling information—for instance, some form of ruler markings as used in conventional word processing layout programs, or drafting programs—along the edges of canvas 215. Such markings could include numerical indicators ranging, for example, from 1 to 10, or other convenient divisions to better identify the gradient. Other variations are of course possible, and will apparent to those skilled in the art based on studies of human perceptual skills and traits and from the teachings herein.

When the user has completed the creation of data picture 210, it can then be saved and stored using conventional techniques as a transaction "reasons" file (or entry) for later use by an underlying application program. A conversion takes place (see FIG. 1, step 125) so that the user data picture can be utilized by an underlying application program. The specifics of such conversion will of course vary from application to application, depending on the nature of the specific data parameters presented to the user, the nature of the specific data canvas, etc, etc. In the present embodiment, an identification is first made of all the data parameters 215 making up data picture 210 on data canvas 215. The placement of such data parameter within data canvas 210 is also noted; in this instance, only the vertical distance component is retained, but it should be apparent that a horizontal component could also be used.

Thus, a typical data picture record can include a transaction identifier, the identity of a data parameter, and a location placement within the gradient (in arbitrary units). Other information can of course be included in such record and many different variations are possible for such data picture record from application to application. Each data picture 210, therefore, will consist of one or more of such data picture records, thus constituting a complete transaction record reflecting a complete capture of the user's perceptions, motivations, reasoning, etc., for a particular transaction. At this point, as indicated at step 130 (FIG. 1) transaction record, and all of its underlying components are available for use by an applications program as needed. In a preferred embodiment, such transaction records are maintained and retrievable at later times by an operator so that personalized lessons can be learned from correlations of the user's data pictures (describing the user's particular rationale for a transaction) and resulting gain or loss from such particular stock purchase or sale transactions.

It should be noted that in addition to the vertical placement component value retained, a horizontal placement component might be used, for example, where data canvas 210 also has a horizontal spectrum (left to right orientation) depicting a different consideration, i.e., such as the user's perception of the credibility of such identified parameter. As an example, a user might identify a rumor as strongly motivating his/her behavior (thus placing the data parameter high on the data canvas), but could also qualify this belief by indicating that the perceived truthfulness of the rumor is low by placing the data parameter on the far left (or right) according to an "accuracy" spectrum. This feature permits the present interface to better capture the "fuzzy" logic of human actions and perceptions through an additional variable qualifying the data parameters identified for a particular transaction.

For purposes of the present invention a detailed description of those features commonly found and understood in application windowing technology (i.e., such as sizing, scrolling, handling and the like) is not provided. Such features can be implemented in any one of many techniques known in the art, and the invention is not limited in any way by such specific implementations.

Consequently, the present invention permits a user of an application program to enter data parameters in an efficient, intuitive, rapid fashion using a single data collection window which captures all of the subjective information in a single snap shot. And, through the manipulation of only a few visual objects representing individual perceptions, motivations, reasons, etc., an underlying application program can capture more relevant data more efficiently than through the use of prior art interfaces.

In addition, the present invention allows, for the first time, for a user to convey his/her mental impressions in a form understood by him/her, and yet parseable in an intelligent fashion by an underlying program. The present inventive interface, in fact, can serve as a simple, non-intimidating environment and mechanism to permit even novice users to interact with sophisticated and complex application programs that would otherwise be avoided. This interaction is expected to increase as application programs begin to make more and more use of "fuzzy" data passed on by users of the same.

In another variation of the present invention, the underlying application program can track prior transaction reasons records created by the user. From this tracking, an evaluation can be made of the N most common data parameters identified by the user, as well as their average placement on data canvas 215. This information, in turn can be used to generate an "expected" data picture 210,' which, when a new transaction reasons record is to be generated (i.e., at step 110) can be presented to the user (at his/her option) as a template to work from. At that point, the user can accept, modify, supplement such data picture 210' based on the particular details of the transaction in question. In this manner, the burden on a user to input relevant data is further minimized.

For added functionality, the underlying application program can also dynamically process data picture 210 into a transaction record, and then visually display a correlation of such transaction record with other transaction records 210' previously entered by the user. In this manner a user can quickly and visually identify similarities, trends, etc. in his/her rationale (or other people's rationales) for such transactions. This feedback window 260 can be generated using any one of conventional programming techniques based on the nature of the underlying data, the perspective desired by the user, the desired sub-set of prior transaction records, the desired correlation, etc., and can be presented alongside graphical interface 200 as illustrated generally in FIG. 2. As a simple example, in the case of a financial trading context, the user could request a comparison chart in feedback window 260 illustrating the overall financial gain/loss in a graph 261 incurred by such user (based on evaluation of prior transaction records) when they (or other users) had identified "Good Dividend," and the "Company has good products" (or some other reasons) as reasons for their purchasing a particular financial instrument. The overall average could be plotted as well as a separate graph 262 as noted. Other variations of feedback window 260 and information to be displayed thereon are of course possible, and the present invention is not limited to any particular implementation. For example, instead of a chart, a simple icon resembling a human face smiling or frowning can communicate positive or negative feedback information, letting the user know immediately whether they are getting closer or further away from an ideal data picture. This aspect of the present invention allows the user to immediately visualize the expected results of the action/transaction based on that person's unique experiences/rationales. This feature is extremely beneficial as it can serve to prevent obvious errors, or to suggest a course of action that is likely to be favorable based on an evaluation of prior transaction data Other potential applications which can utilize this kind of immediate visual feedback including telemarketing, product service support, etc. In such environments, the present interface could be used as a marketing data capture interface, and as data is collected by an operator from a customer, feedback window 260 can present potential options to the operator correlating such user's data with prior data transactions, or against some set of criteria. As one example, in response to various customer descriptions of problems with a product, an operator could be given a visual or symbolic list of potential areas that are the origin of the same. This is but one example, of course, and the present invention can be advantageously used in any number of similar environments.

In yet another variation, data parameters 220 can of course be presented in symbolic, or iconic form, rather than as descriptive text objects. For example, in an application program soliciting feedback on travel modes used by a prospective traveler, menu 220 may instead contain a series of graphical icons representing conventionally accepted depictions of trains, planes, cars, taxis, bicycles, cruise ships, etc. In an application program for capturing entertainment interests, iconic representations of movies, Cds, LP records, television, etc. could be presented as data parameters. Other examples will be apparent to those skilled in the art for other fields of interest.

In another embodiment of the inventive interface 200, instead of corresponding to "reasons" employed by a user for a particular action, parameters 221, 222, etc. in menu 205 correspond generally to "lessons" learned from a particular action/transaction. This way, during an interactive session at step 120 the user is permitted to paint a data picture explaining what he/she learned from the particular experience of engaging in the action/transaction. Preferably this second variation of the inventive interface is used in conjunction with, and as a complement to the first embodiment noted above. For example, after first creating a data picture with the aforementioned graphical interface to identify particular reasons and motivations for a particular action/transaction, the user can then invoke a separate interface at a later time for identifying any subsequent lessons, understandings, etc. that he/she has acquired or associates with the particular action/transaction. This session then results in a second data picture 210 associated with lessons specific to such user which they can store, modify, and learn from to improve their objectivity when participating in such actions/transactions. As an example, in the case of a financial trading context, parameters 205 can list such options as "sold too early," "sold too late," "got in too early," "got in too late," "don't listen to advice from X," etc. This information would be captured by the interface so the user can maintain a permanent but modifiable diary or log of useful data which can be referred to at a later time to evaluate their performance, to see what weaknesses or strengths they exhibit, to see what events seem to influence their thinking, and to observe trends in the same.

As is apparent, for ease of use for the user, this second interface only varies from the first interface described above in the identity of the parameters provided in menu 205, which, again, need only identify particular "lessons" instead of "reasons" in this case. If desired, data canvas 215 can also be modified nonetheless with suitable language adjustments to the spectrum legend to correlate better with the parameters provided in menu 205. Again, as with the first interface, the user can rank the relative perceived importance of the lessons learned, which acts as strong visual feedback when reviewed at a later time.

To better capture the manner in which individuals collect information, the data pictures 210 created by the second interface can also be modified at a later time to reflect new insights garnered by the user. For instance, after closing out a losing transaction involving an equity purchase and sale, the user may identify the fact that they bought too early as a lesson that they learned. At a later time, in the event the equity price rebounds, they may also conclude that they sold too early as well. Because the data picture is stored electronically, it can be retrieved via interface 200 and modified at will by the user to reflect such new understandings and lessons about the action/transaction. This functionality permits the user to better grasp his/her strengths and weaknesses at a glance, and helps reinforce the lessons learned from such actions/transactions.

While the present invention has been described in terms of a preferred embodiment, it will be apparent to those skilled in the art that many alterations and modifications may be made to such embodiments without departing from the teachings of the present invention. For example, it is apparent that the present invention would be beneficial used in any applications program where it is desirable to obtain accurate, reliable information from a user in an efficient, intuitive fashion. Other types of particular implementations for the data parameter menu and data canvas beyond those illustrated in the foregoing detailed description can be used suitably with the present invention. Accordingly, it is intended that the all such alterations and modifications be included within the scope and spirit of the invention as defined by the following claims.

What is claimed is:

1. An electronic interface for permitting a user to communicate subjective data information, the interface comprising:
   a parameter menu, said menu providing a user visible set of data parameters which may be associated with the subjective data information;
   a parameter canvas, said canvas being simultaneously visible with said parameter menu, and being usable by the user for identifying and arranging selected ones of said user visible set of data parameters into a visual form expressing the subjective data information as a graphical arrangement of said selected ones of said visible set of data parameters within said parameter canvas.

2. The interface of claim 1, wherein all of the user's subjective data information concerning an action and/or transaction is captured by such interface as a single graphical arrangement using said data parameters.

3. The interface of claim 1, wherein all of the user's subjective data information concerning an action and/or transaction is captured by such interface during the entirety of a data collection session for said action and/or transaction using a single data collection screen.

4. The interface of claim 1, wherein the subjective data information pertains to the user's mental impressions of an actual or proposed action and/or transaction.

5. The interface of claim 4, wherein said transaction is an event or an item of interest to the user.

6. The interface of claim 1, wherein the subjective data information pertains to lessons learned by such user associated with an action and/or transaction.

7. The interface of claim 1, wherein said parameter menu and a location on said parameter canvas for arranging said selected ones are physically separated by a first distance, and said data parameters associated with the subjective data information are selected and moved by such user along said first distance by physically manipulating an electronic pointing device.

8. The interface of claim 7, wherein said first distance is less than approximately half the width of said interface as seen by the user.

9. The interface of claim 1, wherein said graphical arrangement of said selected ones of said visible set of data parameters associated with the subjective data information are stored as one or more electronic records corresponding to an electronic data picture.

10. The interface of claim 9, wherein said electronic data picture includes numeric data values, but is generated entirely in visual form and without numeric data input by the user.

11. The interface of claim 10, wherein said numeric data values are based on the physical location of said data parameters as placed by the user on said parameter canvas.

12. The interface of claim 11, wherein said electronic data picture can be retrieved and modified at a later time by the user using such interface.

13. The interface of claim 1, wherein said selected ones of said visible set of data parameters can be ranked in relative importance by the user based on their location within said graphical arrangement on said parameter canvas.

14. The interface of claim 13, wherein a relative ranking between said selected ones of said visible set of data parameters can be changed by the user by altering a relative physical arrangement of such data parameters on said parameter canvas.

15. The interface of claim 13, wherein said selected ones of said visible set of data parameters can be ranked by both a relative horizontal and vertical location on said parameter canvas.

16. The interface of claim 13, wherein said parameter canvas includes a gradient visible to the user for assisting in the ranking of said selected ones of said visible set of data parameters.

17. The interface of claim 16, further wherein said parameter canvas conveys visible feedback information when the user is arranging said selected ones of said visible set of data parameters.

18. The interface of claim 1, wherein when the interface is invoked by the user, an initial proposed data picture comprised of a graphical arrangement of one or more of said user visible set of data parameters is presented to the user on said data canvas, which initial proposed data picture can be modified by the user.

19. The interface of claim 1, wherein said data parameters include data parameters visibly displayed in text format.

20. The interface of claim 1, wherein said data parameters include data parameters visibly displayed in symbolic format.

21. The interface of claim 1, wherein said data parameters include factors associated with a user's reasons for performing or engaging in a particular activity.

22. The interface of claim 1, wherein said data parameters include factors associated with a user's mental impressions of an item or event.

23. The interface of claim 1, wherein said data parameters include factors associated with lessons learned by a user concerning an event.

24. A method of inputting data to a computer program, said method comprising:
   presenting a parameter menu to a user, said menu providing a user visible set of data parameters which may be associated with subjective data information;
   presenting a parameter canvas to said user, said canvas being simultaneously visible with said parameter menu, and being usable by the user for expressing the subjective data information in visual form by identifying in a graphical arrangement any of such data parameters that are associated with the subjective data information;
   wherein the data input to such computer program consists of data relating to said graphical arrangement of any of such data parameters arranged by said user on said parameter canvas.

25. The method of claim 24, wherein the subjective data information pertains to the user's mental impressions of an actual or proposed transaction.

26. The method of claim 25, wherein said transaction is an event or an item of interest to the user.

27. The method of claim 24, wherein said data parameters to be included in said graphical arrangement can be selected and moved by said user along a distance spanning from said parameter menu to said parameter canvas by physically manipulating an electronic pointing device.

28. The method of claim 27, wherein said distance is less than approximately half the width of said interface as seen by the user.

29. The method of claim 24, further including a step of storing said graphical arrangement of said data parameters as one or more electronic records corresponding to an electronic data picture.

30. The method of claim 29, wherein said data picture includes numeric data values, but is generated entirely in visual form and without numeric data input by the user.

31. The method of claim 30, wherein said numeric data values are based on the physical location of any of such data parameters placed by the user on said parameter canvas.

32. The method of claim 24, further including a step of ranking any of such data parameters placed on said parameter canvas by adjusting a spatial location of said data parameters in said graphical arrangement.

33. The method of claim 32, wherein any of such data parameters placed on said parameter canvas can be ranked according to their relative physical arrangement to other data parameters on said parameter canvas.

34. The method of claim 32, further including a step of providing a gradient visible to the user for assisting in the ranking of any of such data parameters placed on said parameter canvas.

35. The method of claim 32, further including a step of providing visible feedback information when the user arranges said data parameters on said parameter canvas.

36. The method of claim 32, wherein said data parameters can be ranked by both a relative horizontal and vertical location on said parameter canvas.

37. The method of claim 24, further including a step of presenting an initial data picture to the user on said data canvas, which initial proposed data picture can be modified by the user.

38. The method of claim 24, wherein said data parameters include factors associated with a user's reasons for performing or engaging in a particular activity.

39. The method of claim 24, wherein said data parameters include factors associated with lessons learned by a user concerning an event.

40. The method of claim 24, further including a step of providing a visual comparison between said data input and other data previously input using said parameter canvas.

41. The method of claim 24, further including a step of providing visual feedback based on an evaluation of said data input.

42. The method of claim 24, wherein said parameter canvas captures substantially all of the user's subjective data information concerning an action and/or transaction.

43. The method of claim 24, wherein all of the user's subjective data information concerning an action and/or transaction is captured during a data collection session using a single data collection screen.

44. The method of claim 24, wherein said parameters can be customized by the user.

45. The method of claim 24, wherein said data input by said user is utilized by part of an applications program executable by said user using a computing system.

46. An electronic interface for collecting data within a display window the interface comprising:
   a parameter menu, said parameter menu providing one or more data-related parameters within the window which may be associated with the data;
   a parameter canvas, said parameter canvas being simultaneously visible with said parameter menu within the window, and being adapted such that said user can identify a ranking value for any of said one or more data-related parameters by specifying a physical location on said parameter canvas for any of said one or more data-related parameters;
   wherein the data is expressed as a set of said ranking values that can be stored as a data record.

47. The electronic interface of claim 46, wherein said data-related parameters identify statements and/or assertions associated with an action and/or transaction which can be identified and ranked in said parameter canvas.

48. The electronic interface of claim 46, wherein the data corresponds to non-numerical subjective information from a person associated with an action or transaction, and said set of ranking values are used to convert said non-numerical subjective information into numerical form suitable for use by an applications program.

49. The electronic interface of claim 46, wherein a set of said one or more data-related parameters can be ranked simultaneously through a single graphical arrangement expressed on said parameter canvas.

50. A method of collecting data within an interface display window, comprising the steps of:
   (a) providing one or more data-related parameters within the interface display window which may be associated with the data;
   (b) providing a parameter canvas simultaneously visible with said data-related parameters within the interface display window;
   (c) specifying a ranking value for any of said one or more data-related parameters by specifying a physical location on said parameter canvas for any of said one or more data-related parameters;
   (d) generating a set of said ranking values to correspond to the data;
   (e) storing a data record based on said ranking values.

51. The method of claim 50, wherein said data-related parameters identify statements and/or assertions associated with an action and/or transaction which can be identified and ranked in said parameter canvas.

52. The method of claim 50, wherein the data corresponds to non-numerical subjective information from a person associated with an action or transaction, and said set of ranking values are used to convert said non-numerical subjective information into numerical form suitable for use by an applications program.

53. The method of claim 50, wherein a set of said one or more data parameters can be ranked simultaneously through a single graphical arrangement expressed on said parameter canvas.

54. An interface for an operator to collect data for a customer support applications program, the interface comprising:
 a customer data parameter menu, said customer data parameter menu providing one or more customer-related data parameters within the window which may be associated with the customer data; and
 a customer data parameter canvas simultaneously visible to the operator with said customer data parameter menu during at least part of a data entry session, said customer data parameter canvas being adapted such that selected customer-related data parameters can be identified thereon by the operator in a graphical arrangement and with a relative visual ranking in accordance with information provided to the operator by a customer; and
 a feedback window for displaying feedback information to the operator for responding to said customer, said feedback information being based on the customer support applications program processing said graphical arrangement of said selected customer related data parameters.

55. The interface of claim 54, wherein said feedback information relates to potential origins of problems with a customer product and/or service.

56. The interface of claim 54, wherein the customer-related data parameters relate to customer assertions and/or queries concerning a product and/or service.

57. The interface of claim 54, wherein said interface is laid out in a display window such that said selected customer-related data parameters can be moved by a pointing device to said customer data parameter canvas by traversing a distance equal on average to less than half of a width of said display window to reduce a time required to generate said graphical arrangement.

58. A method of allowing an operator to collect data within a graphical interface for a customer support applications program, the method comprising the steps of:
 (a) providing one or more customer-related data parameters which may be associated with the customer data within a visible window in the graphical interface; and
 (b) providing a customer data parameter canvas that is simultaneously visible to the operator with said customer data parameter menu during at least part of a data entry session;
 (c) arranging selected customer-related data parameters in a graphical arrangement in accordance with information provided to the operator by a customer during said data entry session, such that the data can be expressed as a relative visual ranking of said selected customer-related data parameters; and
 (d) displaying feedback information to the operator for responding to said customer, said feedback information being based on the customer support applications program processing said graphical arrangement of said selected customer-related data parameters.

59. The method of claim 58, wherein said feedback information relates to potential origins of problems with a customer product and/or service.

60. The method of claim 58, wherein the customer-related data parameters relate to customer assertions and/or queries concerning a product and/or service.

61. The method of claim 58, wherein the graphical interface is laid out in a display window such that said selected customer-related data parameters can be moved by a pointing device to said customer data parameter canvas by traversing a distance equal on average to less than half of a width of said display window to reduce a time required to generate said graphical arrangement.

62. An interface for a user to provide data about an item and/or service for a marketing and/or sales applications program, the interface comprising:
 an item/service parameter menu, said item/service parameter menu identifying selection parameters associated with characteristics of the item/service, including at least one of the following characteristics: a price, a performance, and/or a reliability of the item and/or service; and
 an item/service selection canvas simultaneously visible with said item/service parameter menu, during at least part of a data entry session;
 wherein said item/service selection canvas is adapted such that selected ones of said selection parameters can be identified thereon by the user in a graphical arrangement that corresponds to a desired set of selection parameters and a relative ranking to be afforded to each selection parameter in said desired set of selection parameters; and
 further wherein the data is expressed as a graphical arrangement that is captured as a data record for the marketing and/or sales applications program.

63. The interface of claim 62, wherein all of the data from the user about the item and/or service is collected within the interface and without changing windows during a time when said data is expressed as said graphical arrangement.

64. The interface of claim 62, wherein said interface further includes a feedback window for displaying data records correlating with said graphical arrangement.

65. A method of providing data about an item and/or service for a marketing and/or sales applications program within a graphical interface, the method comprising the steps of:
 (a) providing selection parameters associated with characteristics of the item/service within the graphical interface, including at least one of the following characteristics: a price, a performance, and/or a reliability of the item and/or service; and
 (b) providing an item/service selection canvas simultaneously visible with said item/service parameter menu within the graphical interface, during at least part of a data entry session;
 (c) identifying and arranging selected ones of said selection parameters in a graphical arrangement on said item/service selection canvas, which graphical arrangement corresponds to a desired set of selection parameters and a relative ranking to be afforded to each selection parameter in said desired set of selection parameters; and
 wherein the data is expressed as a graphical arrangement that is captured as a data record for the marketing and/or sales applications program.

66. The method of claim 65, wherein all of the data about the item and/or service is collected within the graphical interface and without changing windows during a time when said data is expressed as said graphical arrangement.

67. The method of claim 65, wherein the graphical interface further includes a feedback window for displaying data records correlating with said graphical arrangement.

68. An interface for retrieving data in response to a user query about an item presented within a window, the interface comprising:

a query parameter menu, said query parameter menu providing one or more query-related parameters within which may be associated with the query, said query-related parameters consisting in part at least of predefined descriptions characterizing the item; and a query parameter canvas simultaneously visible with said query parameter menu during at least part of a query entry session, said query parameter canvas being adapted such that selected query-related parameters can be physically arranged thereon corresponding to a desired search criteria for the item; and wherein the query can be presented as a selection and graphical arrangement of said query-related parameters, and said query-related parameters can be relatively ranked based on said graphical arrangement; and a feedback window for displaying feedback information in response to the query.

69. The interface of claim 68, wherein said feedback information includes a set of database records best correlating with the query.

70. The interface of claim 68, wherein said feedback window, said query parameter menu, and said query parameter canvas are all visible at the same time.

71. The interface of claim 68, wherein said feedback information is in the form of a chart, pictorial information, and/or graphical information correlated with the query.

72. The interface of claim 68, wherein said query is associated with a proposed action and/or transaction, and said feedback information includes a predicted financial outcome for said proposed action and/or transaction.

73. A method of formulating a query within a graphical interface for retrieving data records concerning an item comprising the steps of:

(a) providing one or more query-related parameters within the graphical interface which may be associated with the query, said query-related parameters consisting in part at least of predefined descriptions characterizing the item; and (b) selecting a set of query-related parameters in accordance with a search criteria to be used for the query;

(c) arranging said set of query-related parameters in a graphical arrangement on a query parameter canvas, said query parameter canvas being simultaneously visible with said query parameter menu during at least part of a query entry session;

wherein the search criteria are also based on said graphical arrangement of said query-related parameters, including a relative ranking expressed in visual form on said query parameter canvas;

(d) providing a feedback window for displaying feedback information in response to the query.

74. The method of claim 73, wherein said feedback information includes a set of queries best correlating with the query.

75. The method of claim 73, wherein said feedback window, said data parameter menu, and said data parameter canvas are all visible at the same time.

76. The method of claim 73, wherein said feedback information is in the form of a chart, pictorial information, and/or graphical information correlated with the query.

77. The method of claim 73, wherein the item is associated with a proposed action and/or transaction, and said feedback information includes a predicted financial outcome for said proposed action and/or transaction.

78. An interface for capturing subjective information from a user concerning an actual and/or proposed trading activity, the interface comprising:

a parameter menu, said parameter menu providing one or more trading-related parameters within which may be associated with the actual and/or proposed trading activity, said trading-related parameters including at least a set of predefined statements describing reasons for the user engaging in the actual and/or proposed trading activity; and a parameter canvas adapted such that selected trading-related parameters can be physically arranged thereon in a graphical arrangement by the user reflecting the subjective information, and such that invidual ones of said predefined statements can be relatively ranked by the user in accordance with the subjective information to be captured;

wherein the user's subjective information concerning the actual and/or proposed trading activity can be expressed in a visual form.

79. The interface of claim 78, further including a feedback window for displaying an actual and/or expected financial performance based on the subjective information.

80. The interface of claim 79, wherein said actual and/or expected financial performance is based on comparing the subjective information to prior subjective information provided by the user or other users of such interface.

81. The interface of claim 79, wherein said feedback window also provides an indicator expressing a recommendation for the actual and/or proposed trading activity.

82. The interface of claim 79, wherein said feedback window displays a comparison of the user's subjective information with subjective information provided by other users of the interface.

83. The interface of claim 78, wherein said subjective information can be captured as a transaction record that is modifiable later in accordance with additional information learned as a result of engaging in the actual and/or proposed activity.

84. The interface of claim 78, wherein said set of predefined statements include at least one of the following assertions: a price of a security, a technical chart indicator for said security, a press release concerning said security, a personal impression of said security.

85. A method of capturing a user's subjective information concerning an actual and/or proposed trading activity within a graphical interface, the method comprising the steps of:

(a) providing one or more trading-related parameters within which may be associated with the actual and/or proposed trading activity, said trading-related parameters including at least a set of predefined statements describing reasons for the user engaging in the actual and/or proposed trading activity, and (b) permitting the user to select and physically arrange trading-related parameters in a graphical arrangement reflecting the user's subjective information, said graphical arrangement being defined such that invidual ones of said predefined statements can be relatively ranked by the user in accordance with the subjective information to be captured;

wherein the user's subjective information concerning the actual and/or proposed trading activity can be expressed in a visual form.

86. The method of claim 85, further including a step (c) providing a feedback window for displaying an actual and/or expected financial performance based on the subjective information.

87. The method of claim 86, wherein said actual and/or expected financial performance is based on comparing the subjective information to prior subjective information provided by the user or other users of such interface.

88. The method of claim 86, wherein said feedback window also provides an indicator expressing a recommendation for the actual and/or proposed trading activity.

89. The method of claim 86, wherein said feedback window displays a comparison of the user's subjective information with subjective information provided by other users of the interface.

90. The method of claim 85, further including a step (b): capturing the user's subjective information as a transaction record that is modifiable later in accordance with additional information learned as a result of engaging in the actual and/or proposed activity.

91. The method of claim 85, wherein said set of predefined statements include at least one of the following assertions: a price of a security, a technical chart indicator for said security, a press release concerning said security, a personal impression of said security.

* * * * *